(12) United States Patent
Gomez et al.

(10) Patent No.: US 6,475,083 B1
(45) Date of Patent: Nov. 5, 2002

(54) UNLOCKING SECRETS OF VIDEO GAMES

(75) Inventors: George A. Gomez, Evanston, IL (US); Thomas F. Ketola, Chicago, IL (US)

(73) Assignee: Midway Amusement Games, LLC, Chicago, IL (US)

( * ) Notice: Subject to any disclaimer, the term of this patent is extended or adjusted under 35 U.S.C. 154(b) by 0 days.

(21) Appl. No.: 09/703,008

(22) Filed: Oct. 31, 2000

(51) Int. Cl.$^7$ .................................................. A63F 9/24
(52) U.S. Cl. ............................................ 463/1; 463/29
(58) Field of Search ..................... 463/1–9, 29–32, 463/36–38, 43–45, 47; 345/156, 161–162, 168, 536, 532, 503; 710/2, 73, 200, 268, 300; 273/148 B

(56) References Cited

U.S. PATENT DOCUMENTS

| | | | |
|---|---|---|---|
| 5,971,855 A | * 10/1999 | Ng | 463/42 |
| 6,001,015 A | * 12/1999 | Nishiumi et al. | 463/38 |
| 6,293,798 B1 | * 9/2001 | Boyle et al. | 434/29 |
| 6,338,105 B1 | * 1/2002 | Nizuma et al. | 710/72 |

* cited by examiner

*Primary Examiner*—Joe H. Cheng
*Assistant Examiner*—K. Nguyen
(74) *Attorney, Agent, or Firm*—Jenkens & Gilchrist

(57) ABSTRACT

A video game system and method is provided in which the enabled content of a video game depends upon the type of video game controller coupled to the video game console. Specifically, in response to recognizing the video game controller as being of a matching type, the video game enables or "unlocks" extra features or "secrets" of the video game which are not otherwise available. By creating such a strong synergy between the video game and the matching video game controller, consumers are most likely to be attracted to the matching video game controller instead of other game controllers available in the marketplace.

22 Claims, 2 Drawing Sheets

UNLOCKING SECRETS OF VIDEO GAMES

FIELD OF THE INVENTION

The invention relates generally to video games and, more particular, to a video game system and method in which the enabled content of a video game depends upon the type of video game controller used to play the video game.

BACKGROUND OF THE INVENTION

A typical video game system includes a video game console, at least one video game controller, and game software. The game software is typically stored in a cartridge or disc that is inserted into the console. The console contains conventional hardware and software for executing the game software. To permit a user to play a game included in the game software, the video game controller is communicatively coupled to the video game console.

Typically, different types of video game controllers can be used by a player to control the same game. One type of controller, however, may work better with the game than another type of controller. For example, if the game involves vehicle racing, a simple type of game controller may act like a push-button that only provides a user with two discrete vehicle acceleration choices: (1) full acceleration, e.g., "pedal to the metal" or (2) no acceleration at all. On the other hand, a special type of racing controller may allow a user to accelerate the vehicle at various rates between full acceleration and no acceleration. Thus, the different controllers provide different ways to control the vehicle in the game and, more specifically, the special type of racing controller in the above example provides more ways to control the vehicle than the simple type of controller. Regardless of the game controller used to play the game, however, the enabled/available content of the game remains the same and is independent of the type of game controller coupled to the video game console. In the example given above, the vehicle in the game is always capable of being accelerated at various rates between full acceleration and no acceleration. Only the special type of racing controller, however, takes advantage of this capability.

Where the peripherals options available for purchase by a consumer include a number of competing game controllers and the benefits of each controller are roughly the same (or perceived to be the same), users are most likely to be attracted to the controllers that afford the most entertainment. Accordingly, in the competitive peripherals industry, there is a continuing need for peripherals manufacturers to develop different techniques to attract consumers to their products. The present invention is directed to satisfying these needs.

SUMMARY OF THE INVENTION

In accordance with the present invention, there is provided a video game system and method in which the enabled content of a video game depends upon the type of video game controller coupled to the video game console. Specifically, in response to recognizing the video game controller as being of a matching type, the video game enables or "unlocks" extra features or "secrets" of the video game which are not otherwise available. By creating such a strong synergy between the video game and the matching video game controller, consumers are most likely to be attracted to the matching video game controller instead of other game controllers available in the marketplace.

BRIEF DESCRIPTION OF THE DRAWINGS

The foregoing and other advantages of the invention will become apparent upon reading the following detailed description and upon reference to the drawings in which.

Figure 1:
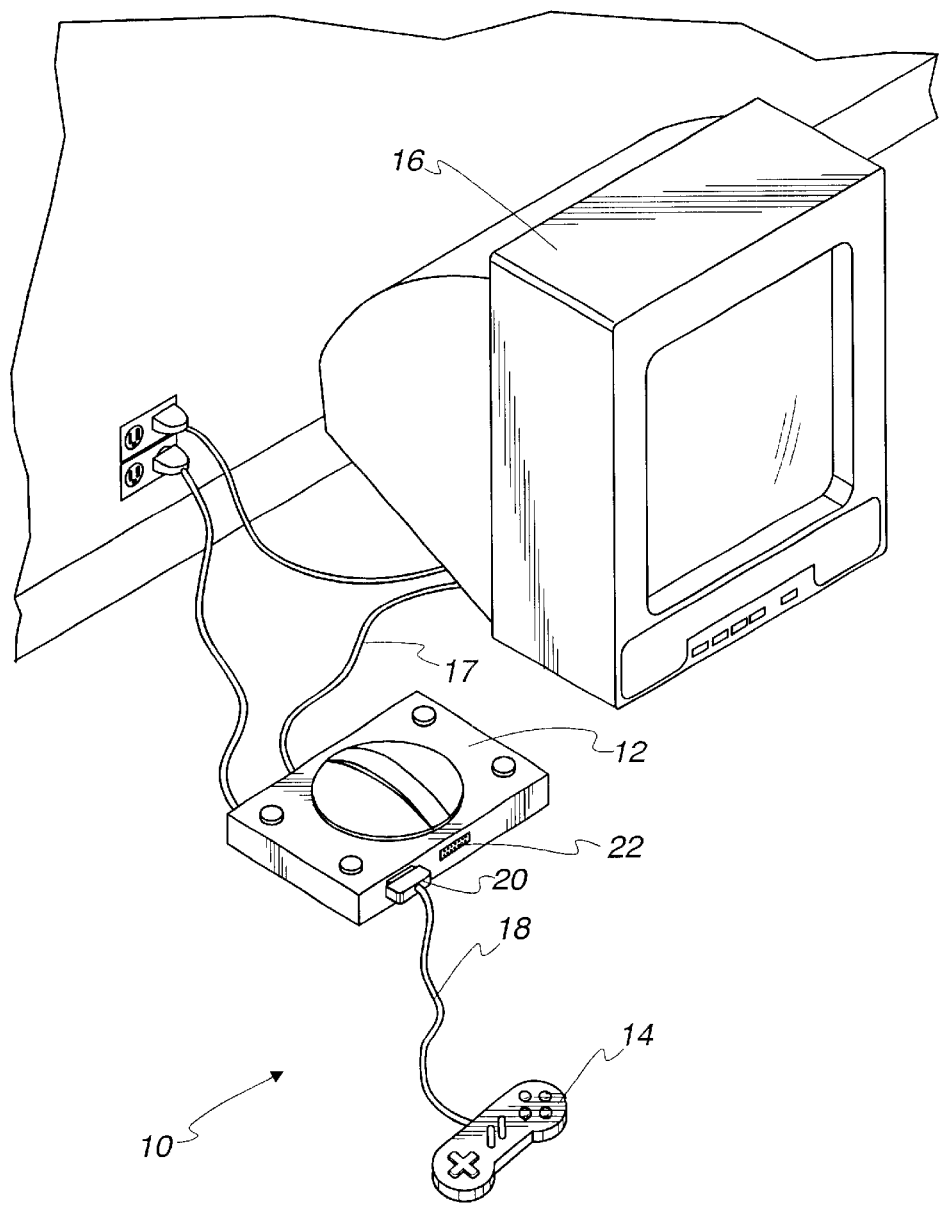
FIG. 1 is a perspective view of a video game system embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings, FIG. 1 depicts a video game system 10 includes a video game console 12 and a game controller 14. The video game console 12 accommodates a video game memory, such as a removable cartridge, disc, or the like, and contains a central processing unit (CPU) for executing the game software stored in the game memory. The video game console 12 is preferably of the type for home use such as the Nintendo 64, Sony PlayStation, and Sega Dreamcast systems. Video game consoles such as these are electrically connected to a standard home television 16 by a cable 17 and are powered by a typical 110 volt AC wall outlet. The game controller 14 may have a variety of configurations and buttons and is electrically connected to the game console 12 by a cable 18. The cable 18 is terminated by a connector 20 adapted to mate with one of the connector interfaces 22 on the video game console 12.

Figure 2:
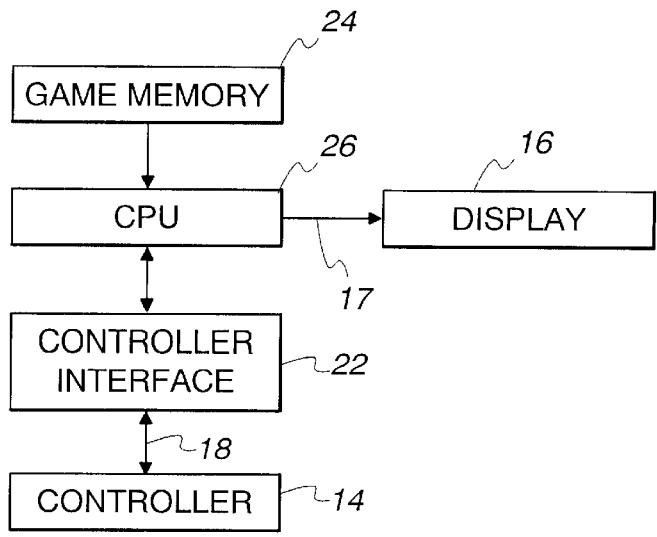
FIG. 2 is a block diagram of the components of the video game system.

FIG. 2 depicts a block diagram of the components of the video game system. These components include a game memory 24, the video game console's CPU 26, the controller interface 22, and the controller 14. The CPU 26 is enclosed within a housing of the video game console 12 (see FIG. 1). The CPU 26 executes the game software stored in the game memory 24 and depicts game play elements associated with the executed software on the video display 16. The game play elements may, for example, include characters, vehicles, implements, background, special effects, etc. The CPU 26 manipulates these game play elements in response to user inputs entered at the game controller 14 and transmitted from the controller 14 to the CPU 26 via the cable 18 and controller interface 22. After the video game memory 24 is installed in the video game console and the console is switched on, the CPU 26 executes the game software (code) stored in the game memory 24. At this time, the game software causes the CPU 26 to select the content of the video game based upon the type of video game controller 14 connected to the console.

Figure 3:
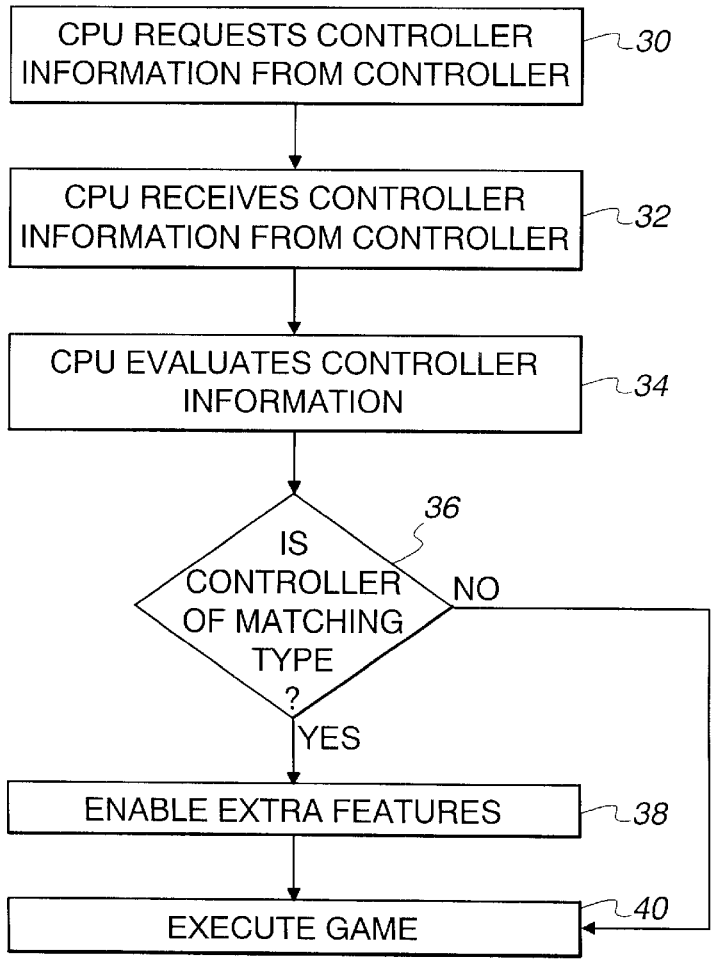
FIG. 3 is a flow diagram of a method for enabling extra features of a video game executed by the video game system.

Referring to FIG. 3, in accordance with the present invention the game software first causes the CPU to request information about the connected game controller from the controller at step 30. Such a request is typically made by calling a library function pertaining to the controller information. The controller, in turn, provides the information to the CPU at step 32. The controller information may, for example, be organized into a standardized format comprised of a plurality of fields containing respective integer or string data as follows:

| FIELD | INFORMATION |
|---|---|
| Controller Port | 0 |
| Controller Type | 0 × 41 |
| Controller Features | 0 × 31 |
| Controller Name | "steering wheel" |
| Extended Information | "Midway Amusement Games ™" |
| Controller Status | continuously changing data concerning what controls are actuated, etc. |

The "Controller Port" and "Controller Status" fields are variable. The "Controller Port" field identifies the interface of the video game console into which the controller is plugged. The "Controller Status" field indicates the status of each control on the controller during game play. The remaining fields are generally static. The "Controller Type" field contains a unique identification code assigned by the manufacturer of the video game console based upon the type of controller. Examples of different types of controllers include steering wheels, light guns, game pads, joysticks, and track balls. Likewise, the "Controller Features" field contains a unique identification code assigned by the manufacturer of the video game console based upon what controls are available on the controller. Examples of different controls that may be available on the controller include controls that indicate direction, speed, and selection. The "Controller Name" field contains a controller name selected by the manufacturer of the controller. Finally, the "Extended Information" field may contain any string of characters selected by the manufacturer of the controller so long as the string is no greater than a predetermined length.

In accordance with the game software, the CPU then evaluates the controller information at step 34. More specifically, the CPU evaluates the "Extended Information" field and determines whether or not the controller is of a matching type at step 36. If the controller is of a matching type, the game software causes the CPU to enable or "unclock" extra features or "secrets" of the video game at step 38 and then execute the game at step 40. The video game, of course, would need to be designed to include such extra features that may be enabled by the matching controller. If, however, the controller is not of a matching type, the extra features of the video game remain disabled when the game is executed at step 40.

If a particular manufacturer both publishes the video game with unlockable extra features and makes the game controller, the manufacturer may attract consumers to its game controller over other controllers available in the marketplace by allowing only its game controller to enable the extra features in the video game. To accomplish this, the "Extended Information" field may be filled with a unique name or trademark associated with the video game and/or the game publisher. For example, if the video game is published by a manufacturer such as the instant assignee, Midway Amusement Games, this name may be placed in the "Extended Information" field. Then, the video game software may be designed to search for this name in the "Extended Information" field and to enable the extra features of the video game in response to in fact finding this name in the "Extended Information" field.

Therefore, in connection with the flow diagram in FIG. 3, the game controller would be considered to be of a matching type in step 36 in response to recognizing the matching name in the "Extended Information" field of the controller information. In essence, the matching name in the "Extended Information" field serves as a key that, when recognized, unlocks the extra features in the video game. Such extra features would not be available to non-matching controllers, i.e., controllers made by other manufacturers. Examples of extra features of the video game only available to players who employ a matching controller include extra tracks in a vehicle racing game, extra vehicles in a vehicle racing game, extra teams in a sports game, extra courts and stadiums in a sports game, extra plays in a sports game, extra characters, extra character attributes, extra implements, extra "energy boosts" or "power ups," player-customizable characters not otherwise available, etc.

While the present invention has been described with reference to one or more particular embodiments, those skilled in the art will recognize that many changes may be made thereto without departing from the spirit and scope of the present invention. Each of these embodiments and obvious variations thereof is contemplated as failing within the spirit and scope of the claimed invention, which is set forth in the following claims.

What is claimed is:

1. A method of enabling extra features of a video game based upon a type of video game controller used to play the video game, the method comprising:

providing the game controller with controller information indicating whether or not the game controller is of a matching type;

reading the controller information; and enabling the extra features of the video game in response to the controller information indicating that the game controller is of the matching type.

2. The method of claim 1, wherein in response to the controller information indicating that the game controller is not of the matching type, the extra features of the video game remain disabled such that the extra features are unavailable to a player of the video game.

3. The method of claim 1, further including installing the video game in a video game console and executing the video game with a central processing unit of the video game console.

4. The method of claim 3, wherein the video game causes the central processing unit to perform the step of reading the controller information.

5. The method of claim 4, wherein the video game causes the central processing unit to perform the step of enabling the extra features of the video game.

6. The method of claim 1, wherein the extra features include extra video content not otherwise available.

7. The method of claim 6, wherein the extra video content is selected from a group consisting of extra vehicles, extra characters, extra character implements, and extra background.

8. The method of claim 1, wherein the controller information includes an entity name or trademark.

9. A method of enabling extra video content of a video game, comprising:

providing the video game with standard video content and the extra video content;

providing a game controller for playing the video game, the standard video content being available to the game controller;

determining whether or not the game controller is of a matching type; and making the extra video content available to the game controller in response to determining that the game controller is of the matching type.

10. The method of claim 9, wherein the extra video content is selected from a group consisting of extra vehicles, extra characters, extra character implements, and extra background.

11. A method of enabling extra video content of a video game, the video game including standard video content and the extra video content, the method comprising:

determining whether or not a game controller coupled for playing the video game is of a matching type; and making the standard video content and the extra video content available to the game controller if the game controller is determined to be of the matching type; otherwise, making only the standard video content available to the game controller.

12. The method of claim 11, wherein the extra video content is selected from a group consisting of extra vehicles, extra characters, extra character implements, and extra background.

13. A system for enabling extra features of a video game, comprising:

a game controller with controller information indicating whether or not the game controller is of a matching type;

means for reading the controller information; and means for enabling the extra features of the video game in response to the controller information indicating that the game controller is of the matching type.

14. The system of claim 13, wherein in response to the controller information indicating that the game controller is not of the matching type, the extra features of the video game remain disabled such that the extra features are unavailable to a player of the video game.

15. The system of claim 13, further including a video game console having a central processing unit executing the video game when the video game is installed in the video game console, the central processing unit including the means for reading and the means for enabling when executing the video game.

16. The system of claim 13, wherein the extra features include extra video content not otherwise available.

17. The system of claim 16, wherein the extra video content is selected from a group consisting of extra vehicles, extra characters, extra character implements, and extra background.

18. The system of claim 13, wherein the controller information includes an entity name or trademark.

19. A system for enabling extra video content of a video game, the video game including standard video content and the extra video content, the system comprising:

a game controller coupled for playing the video game, the standard video content being available to the game controller;

means for determining whether or not the game controller is of a matching type; and means for making the extra video content available to the game controller in response to determining that the game controller is of the matching type.

20. The system of claim 19, wherein the extra video content is selected from a group consisting of extra vehicles, extra characters, extra character implements, and extra background.

21. A system for enabling extra video content of a video game, the video game including standard video content and the extra video content, the system comprising:

means for determining whether or not a game controller coupled for playing the video game is of a matching type; and means for making the standard video content and the extra video content available to the game controller if the game controller is determined to be of the matching type, and otherwise making only the standard video content available to the game controller.

22. The system of claim 21, wherein the extra video content is selected from a group consisting of extra vehicles, extra characters, extra character implements, and extra background.

* * * * *